(12) United States Patent
Zywiak et al.

(10) Patent No.: US 10,934,875 B2
(45) Date of Patent: Mar. 2, 2021

(54) SEAL CONFIGURATION TO PREVENT ROTOR LOCK

(71) Applicant: UNITED TECHNOLOGIES CORPORATION, Farmington, CT (US)

(72) Inventors: Allison Zywiak, Durham, CT (US); Graham R. Philbrick, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 920 days.

(21) Appl. No.: 14/687,505

(22) Filed: Apr. 15, 2015

(65) Prior Publication Data

US 2016/0305266 A1  Oct. 20, 2016

(51) Int. Cl.
*F01D 11/08* (2006.01)
*F01D 11/12* (2006.01)
(Continued)

(52) U.S. Cl.
CPC ............ *F01D 11/08* (2013.01); *F01D 11/001* (2013.01); *F01D 11/12* (2013.01); *F01D 11/122* (2013.01);
(Continued)

(58) Field of Classification Search
CPC .......... F01D 11/08; F01D 11/10; F01D 11/12; F01D 11/122; F01D 11/125;
(Continued)

(56) References Cited

U.S. PATENT DOCUMENTS 3,314,651 A * 4/1967 Beale .................. A61K 8/4913
                                                        415/173.6
4,103,899 A * 8/1978 Turner ................. F01D 11/001
                                                        277/303
(Continued)

FOREIGN PATENT DOCUMENTS

EP        2105581 A2    9/2009
EP        2613008 A1    7/2013
(Continued)

OTHER PUBLICATIONS

European Search Report for EP Application No. 16 16 5518.
European Office Action for EP Application No. 16165518.8-1006 dated Nov. 23, 2018, 4 pages.

*Primary Examiner* — Kenneth Bomberg
*Assistant Examiner* — Christopher R Legendre
(74) *Attorney, Agent, or Firm* — Cantor Colburn LLP

(57) ABSTRACT

The present disclosure relates to gas turbine engine and seal configurations, and components for a gas turbine engine. In one embodiment, a seal for a gas turbine engine includes a rotary seal element, the rotary seal element configured to rotate during operation of a gas turbine engine, and a stationary seal element having an annular seal surface. The stationary seal element includes a first area of the annular seal surface configured to engage with the rotary seal element, and the stationary seal element includes a second area of the annular seal surface configured to provide reduced resistance to the rotary seal element during a flight windmilling event.

6 Claims, 3 Drawing Sheets

(51) Int. Cl.
  *F01D 11/00* (2006.01)
  *F02C 7/28* (2006.01)
  *F16J 15/34* (2006.01)

(52) U.S. Cl.
  CPC .............. *F01D 11/127* (2013.01); *F02C 7/28* (2013.01); *F16J 15/34* (2013.01); *F05D 2220/32* (2013.01); *F05D 2240/55* (2013.01)

(58) Field of Classification Search
  CPC .... F01D 11/127; F01D 11/001; F01D 11/005; F01D 11/006; F01D 11/008; F01D 11/02; F02C 7/28; F05D 2240/55; F16J 15/34; F16J 15/4472; F04D 29/08; F04D 29/083; F04D 29/086; F04D 29/10; F04D 29/12; F04D 29/122; F04D 29/126; F04D 29/16; F04D 29/161; F04D 29/162; F04D 29/164; F04D 29/165; F04D 29/167; F04D 29/168; F04D 29/2266
  See application file for complete search history.

(56) References Cited

U.S. PATENT DOCUMENTS

| | | | | |
|---|---|---|---|---|
| 4,986,737 A * | 1/1991 | Erdmann | .............. | B23P 15/006 416/190 |
| 5,333,993 A * | 8/1994 | Stueber | ................. | F01D 11/001 277/414 |
| 5,429,478 A * | 7/1995 | Krizan | .................. | F01D 11/001 415/115 |
| 5,749,701 A * | 5/1998 | Clarke | .................. | F01D 11/001 415/115 |
| 6,402,157 B1 * | 6/2002 | Zhou | .................... | F16J 15/3288 277/355 |
| 7,037,067 B2 * | 5/2006 | Okita | ...................... | F01D 5/082 415/115 |
| 7,465,152 B2 * | 12/2008 | Nigmatulin | ............... | F01D 5/20 415/170.1 |
| 7,857,582 B2 * | 12/2010 | Kovac | .................. | F01D 11/001 415/173.7 |
| 8,690,527 B2 * | 4/2014 | Matwey | .................. | F01D 11/02 415/173.7 |
| 9,097,136 B2 * | 8/2015 | Chouhan | ............... | F01D 11/127 |
| 9,416,673 B2 * | 8/2016 | Caprario | ............... | F01D 11/001 |
| 2008/0260523 A1 * | 10/2008 | Alvanos | ............... | F01D 11/001 415/173.4 |
| 2008/0274336 A1 | 11/2008 | Merrill et al. | | |
| 2009/0014964 A1 * | 1/2009 | Pu | ......................... | F01D 11/001 277/414 |
| 2011/0193293 A1 * | 8/2011 | Mega | ...................... | F01D 5/081 277/412 |
| 2013/0168927 A1 * | 7/2013 | Simpson | ............... | F01D 11/001 277/414 |
| 2013/0170964 A1 * | 7/2013 | Chouhan | ............... | F01D 11/127 415/174.2 |
| 2013/0183145 A1 * | 7/2013 | Caprario | ............... | F01D 11/001 415/173.7 |
| 2015/0330245 A1 * | 11/2015 | Vo | ............................. | F02C 7/28 415/173.1 |
| 2016/0305266 A1 * | 10/2016 | Zywiak | ............... | F01D 11/001 |

FOREIGN PATENT DOCUMENTS

FR 2988022 A1 * 9/2013 .............. B22C 7/02
WO 2014168804 A1 10/2014

* cited by examiner

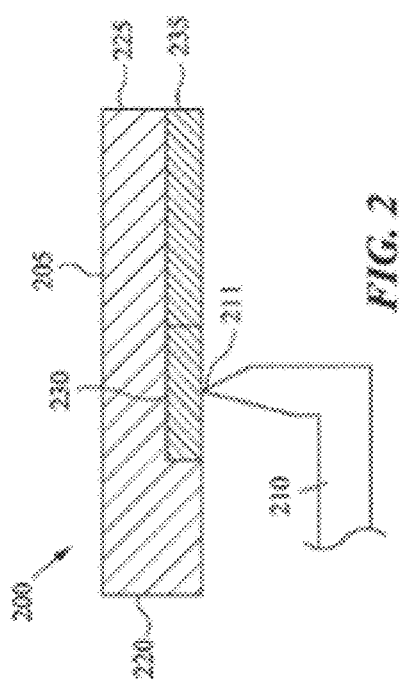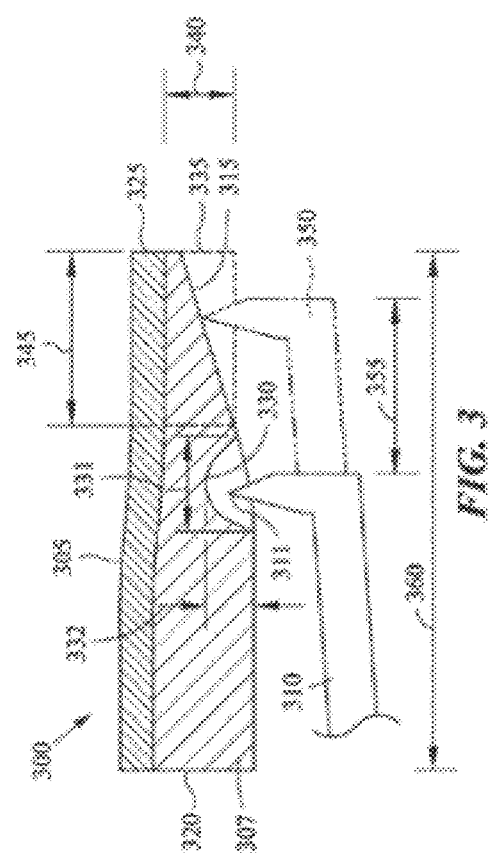

SEAL CONFIGURATION TO PREVENT ROTOR LOCK

FIELD

The present disclosure relates to seal configurations for gas turbine engines and, in particular, to seal configurations to reduce rotor lock for gas turbine engines.

BACKGROUND

Gas turbine engines are required to operate efficiently during operation and flight. Theses engines create a tremendous amount of force and generate high levels of heat. As such, components of these engines are subjected to high levels of stress, temperature and pressure. It is necessary to provide components that can withstand the demands of a gas turbine engine.

Flight windmilling events may occur due to unexpected engine shutdown. One result of a flight windmilling event may be rotor lock due to differential cooling of engine static/rotating components. Rotor lock is undesirable during operation of an engine. There is a desire to improve seal configurations and seal response to flight windmilling events. There is also a desire to improve seal and gas turbine engine configurations.

BRIEF SUMMARY OF THE EMBODIMENTS

Disclosed and claimed herein are components and configurations for gas turbine engines and gas turbine engines including seals. One embodiment is directed to a seal for a gas turbine engine including a rotary seal element configured to rotate during operation of a gas turbine engine and a stationary seal element having an annular seal surface. The stationary seal element includes a first area of the annular seal surface configured to engage with the rotary seal element, and a second area of the annular seal surface configured to provide reduced resistance to the rotary seal element during a flight windmilling event.

In one embodiment, the rotary seal element is a knife edge seal including at least one contact element.

In one embodiment, the second area of the stationary seal element is tapered to provide additional clearance between the stationary seal element and the rotary seal element.

In one embodiment, the second area extends from a trailing edge of the stationary seal element to a position aft of a contact point of the rotary seal element and stationary seal element.

In one embodiment, the second area of the stationary seal element includes deformations, wherein the deformations are positioned along a trailing edge of the stationary seal element.

In one embodiment, the second area of the stationary seal element is aft of the first area and associated with a contact position of the rotary seal element to the stationary seal element.

In one embodiment, the stationary seal element includes honeycomb sealing material along the annular seal surface.

In one embodiment, the rotary seal element is a contact surface of the rotary seal element to the stationary seal element.

In one embodiment, the second area of the stationary seal element is configured to provide reduced resistance to the rotary seal element during a flight windmilling event.

In one embodiment, the second area of the annular seal surface is configured to provide reduced resistance to the rotary seal element during a flight windmilling event by providing at least one of axial and radial clearance for the rotary seal element.

Another embodiment is directed a gas turbine engine including a plurality of blade elements, a casing, and a seal between the plurality of blade elements and casing. The seal includes a rotary seal element configured to rotate during operation of a gas turbine engine, and a stationary seal element having an annular seal surface. The stationary seal element includes a first area of the annular seal surface configured to engage with the rotary seal element, and the stationary seal element includes a second area of the annular seal surface configured to provide reduced resistance to the rotary seal element during a flight windmill event.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 2 depicts graphical representations of a seal configuration according to an embodiment;

FIG. 3 depicts a graphical representation of a seal configuration according to one or more embodiments.

DETAILED DESCRIPTION OF THE EXEMPLARY EMBODIMENTS

Overview and Terminology

One aspect of this disclosure relates to configurations for gas turbine engines and gas turbine engine seals. In one embodiment, a configuration is provided for a seal to prevent rotor lock during a flight windmilling event. Flight windmilling events as described herein relate to engine shut down during flight, wherein airfoils of the engine and other rotor elements will continue to spin depending on the forward airspeed. Rotor lock can cause airfoils, and other rotor elements, to lock in position due to one or more rotor elements becoming fixed to a stationary element. Rotor lock may be caused during a flight windmilling event as the air pressure ratio across the engine is low, thus, external portions of the engine are exposed to the ambient airflow driven thermal contraction of the outer portions of the engine while the inner elements maintain thermally expanded. The expansion/contraction of engine portions are in both the axial and radial directions. As such, inside core elements of the engine may be locked in place through interference in either the axial or radial. Rotor lock may prevent an engine from relighting.

One or more configurations are provided for gas turbine engines including seal geometries to increase clearance and/or prevent rotor lock as a thermal gradient between the rotating and static sides increase. It should be appreciated that the features described herein could be employed with any rotary seal, including blades in outer air seals.

As used herein, the terms "a" or "an" shall mean one or more than one. The term "plurality" shall mean two or more than two. The term "another" is defined as a second or more.

The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

Figure 1:
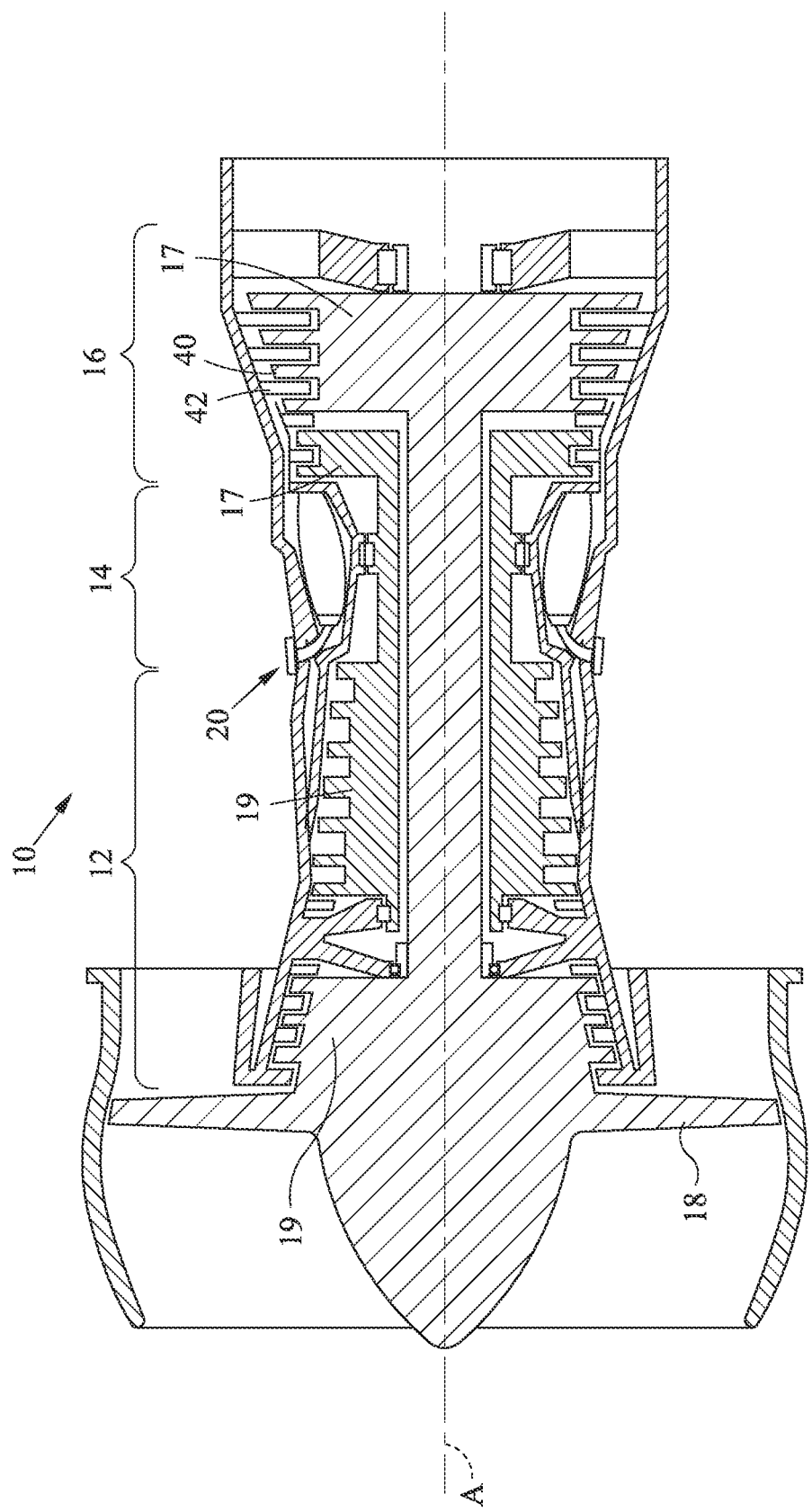
FIG. 1 depicts a graphical representation of a gas turbine engine according to one or more embodiments.

FIG. 1 depicts a graphical representation of a gas turbine engine according to one or more embodiments. Gas turbine engine 10 may be a turbofan gas turbine engine and is shown with reference engine centerline A. Gas turbine engine 10 includes compressor 12, combustion section 14, turbine section 16, and fan 18. Air compressed by compressor 12 is mixed with fuel which is burned in the combustion section 14 and expanded across turbine section 16. The turbine section 16 includes rotors 17 that rotate in response to the expansion and can drive compressor rotors 19 and fan 18. Turbine rotors 17 carry blades 40. Fixed vanes 42 are positioned intermediate rows of blades 40. According to one embodiment, one or more seals of gas turbine engine 10 may be configured to prevent rotor lock during a flight windmilling event, such as rotor lock compressor rotors 19 and/or turbine rotors 17 relative to casing 20 of gas turbine engine 10.

FIG. 2 depicts graphical representation of a seal configuration according to an embodiment. Seal 200 includes stationary (e.g., non-rotating) seal element 205 and rotary seal element 210. According to one embodiment, seal 200 is an abradable seal, such that operation of seal 200 in a gas turbine engine will result in rotary element 210 wearing into stationary seal element 205. For purposes of illustration, rotary seal element 210 is depicted contacting stationary seal element 205, wherein seal blade 211 of the rotary seal element is contacting stationary seal element 205. Accordingly, FIG. 2 may represent a seal configuration for seal 200 prior to a green run of the engine.

Rotary seal element 210 is configured to rotate during operation of a gas turbine engine. Rotary seal element 210 includes edge 211 which may be configured to engage and abrade stationary seal element 205. In certain embodiments, rotary seal element 210 includes a plurality of edges or contact points with stationary seal element 205. Rotary seal element 210 may be a knife edge seal including at least one contact element.

Stationary seal element 205 may be an annular structure configured for positioning in one or more locations of gas turbine engine 10. Stationary seal element 205 includes leading edge 220 associated with the front or leading portion of the seal element and trailing edge 225 associated with the aft portion of the seal element. Stationary seal element 205 includes an annular seal surface having a first area 230. According to one embodiment, first area 230 of the annular seal surface is configured to engage with the rotary seal element 210 and in particular edge 211. According to one embodiment, first area 230 is shown and described as a region edge 211 may be in contact with stationary seal element 205 or one or more positions along stationary seal element 205 due to mounting position, part spacing, etc. Stationary seal 205 also includes a second area 235 of the annular seal surface configured to provide reduced resistance to rotary seal element 210 during a flight windmilling event. First area 230 and second area 235 may each be abradable portions of stationary seal element 205. In certain embodiments, first area 230 and second area 235 include honeycomb material to provide a seal interface with rotary seal element 210.

FIG. 3 depicts a graphical representation of a seal configuration according to one or more embodiments. Seal 300 is depicted including a stationary seal element 305 configured to interoperate with rotary seal element 310 to form a seal for one or more rotary components of a gas turbine engine. Stationary seal element 305 includes abradable portion or material 307 which may be a honeycomb material or other abradable material. According to one embodiment, rotary seal element 310 includes edge 311 configured to abrade abradable portion or material 307 of stationary seal element 305 and form trench 330.

One embodiment of the disclosure is to provide one or more configurations to prevent rotor lock during a flight windmilling event. Rotor lock may be caused by rotating elements, such as seal edge 311 locking to stationary seal element 305. Flight windmilling, or engine shut down during flight may cause the casing of a gas turbine engine to cool and thus, rapidly shrink. As a result, rotary seal element 310 may be axially and radially displaced from trench 330. FIG. 3 depicts an exemplary representation of flight windmilling position 350 of rotary element 310 and edge 311.

According to one embodiment, stationary seal element 305 is an annular structure including leading edge 320 and trailing edge 325, wherein trailing edge includes an angled or sloped configuration 315 aft of trench 330. According to one embodiment, configuration 315 provides additional clearance for edge 311 during a flight windmilling event. Configuration 315 may be a tapered stationary seal element to provide additional clearance between the stationary seal element and the rotary seal element.

According to one embodiment, second area 335 of abradable portion or material 307 is configured to reduce resistance of edge 311 and/or allow prevent rotor lock for flight windmilling position 350. Windmilling position 350 may be modeled or determined by testing to correlate with one or more offset positions 355 relative to trench 330 and/or edge 311. Based on windmill position 350 and/or offset 355, configuration 315 allows for one or more of edge 311 to rotate during a windmilling event, increased clearance of edge 311 relative to stationary seal element 315 during a windmilling event, and to reduce the amount of abradable material for edge 311 to trench during a windmilling event. Configuration 315 includes chamfered or angled trailing edge for abradable material having a height 340 and width 345. Seal width is shown as 360.

According to one embodiment, trailing edge of second area 335 has a height 340 and width 345 tied to an engine application. By way of example, position of the seal within the engine, the amount of thermal expansion, the type of engine, and material type may affect the trailing edge slope and/or curvature. In an exemplary embodiment, width 345 of trailing edge for configuration 315 may relate to a one to two times width 331 of the operational trench 330 in back of the operational trench, and a height 340 at least as deep as trench height 332. According to one embodiment, the slope/trailing edge for configuration 315 begins or slopes on the very early portions of a slope windmilling area within second area 335.

According to one embodiment, features of seal 300 may be employed in addition to or separate from the features discussed below and depicted in FIGS. 4A-4D.

FIGS. 4A-4D depict graphical representations of seal configurations according to one or more embodiments. According to one embodiment, a stationary seal element of seal, such as an abradable seal, may be configured with one or more deformations along a trailing edge of the stationery seal element. Features discussed below and depicted in FIGS. 4A-4D may be employed in addition to, or separate from, the features of FIG. 3.

Figure 4A:
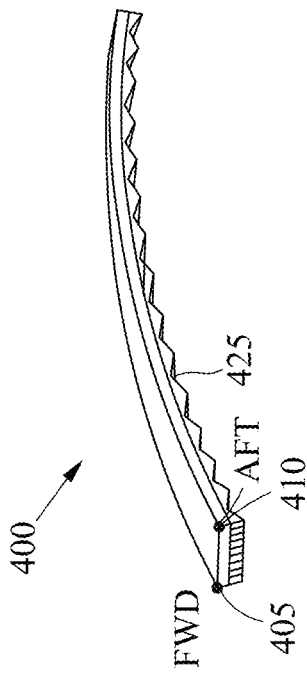
FIGS. 4A-4D depict graphical representations of seal configurations according to one or more embodiments.

FIG. 4A depicts a side cross-sectional view of stationary seal element 400 including leading (e.g., forward) edge 405 and trailing (e.g., aft) edge 410, the aft portion including region 420 which may be configured with a reduced amount of material a seal edge must abrade during a flight windmilling event. Region 420 identifies exemplary profiles of one or more notches or deformations that may be included in stationary seal element 400. According to one embodiment, the slope and deformation depth of region 420 may be based on engine application.

Figure 4B:
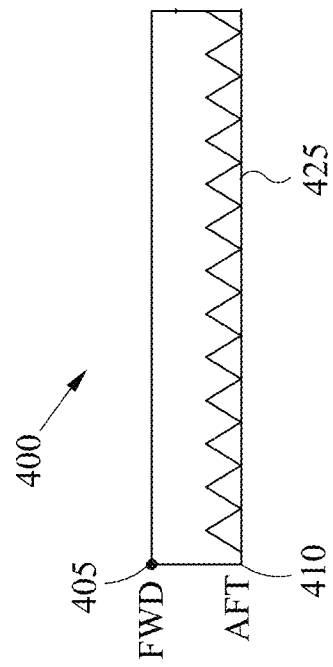
Figure 4C:
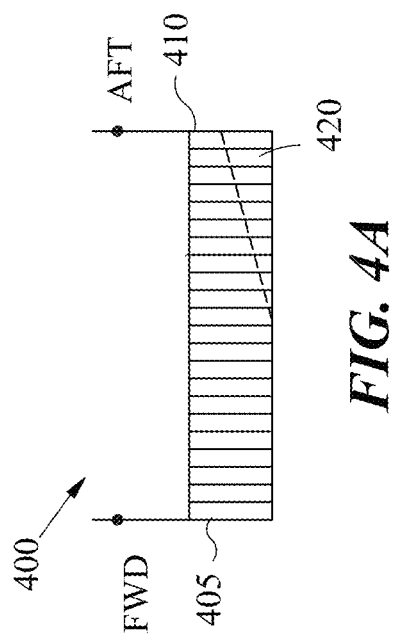
Figure 4D:
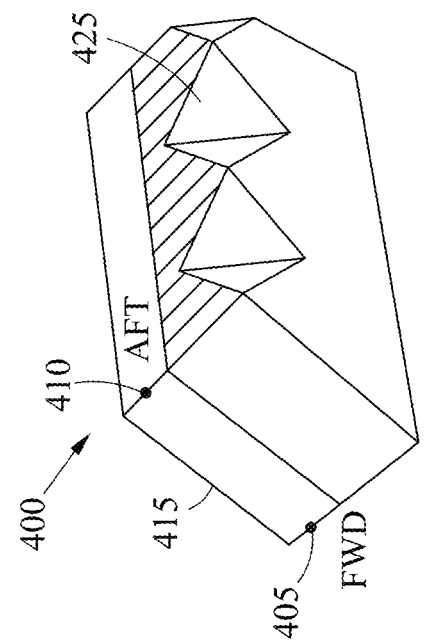

FIG. 4B depicts a graphical representation of stationary seal element 400 with deformations 425 along a trailing edge 410. FIG. 4C depicts an exploded view stationary seal element 400 with deformations 425. According to one embodiment, deformations 425 relate to one or more cutaway or notched portions 415 of the seal structure. By providing notched or removed material, a rotary seal element can rotate with less resistance against stationary seal element 400 during a flight windmilling event. FIG. 4D depicts a graphical representation of stationary seal element 400 from the bottom of stationary seal element 400 and depicts an annular seal surface according to one or more embodiments.

While this disclosure has been particularly shown and described with references to exemplary embodiments thereof, it will be understood by those skilled in the art that various changes in form and details may be made therein without departing from the scope of the claimed embodiments.

What is claimed is:

1. A seal assembly for a gas turbine engine, the seal assembly comprising:
  a stationary seal element including:
   (i) a heightwise outer segment having a first height and extending continuously from a leading edge to a trailing edge; and
   (ii) a heightwise inner segment having a second height and a heightwise inner surface that forms an annular surface, the heightwise inner segment formed of three mutually contacting portions including:
     (a) a first portion being integral with the heightwise outer segment and extending to the leading edge;
     (b) a second portion that is a first abradable portion extending aft from the first portion; and
     (c) a third portion that is a second abradable portion extending aft from the first abradable portion to the trailing edge and providing a reduced resistance to wear relative to the second portion;
  wherein the first abradable portion and the second abradable portion each have a heightwise outer surface that contacts the heightwise outer segment; and
  a rotary seal element that rotates during operation of the gas turbine engine, the rotary seal element comprising a knife edge that faces the annular surface, wherein the stationary seal element and the rotary seal element are configured such that the rotary seal element:
   (i) engages the first abradable portion when the rotary seal element rotates under engine power; and
   (ii) engages the second abradable portion when the rotary seal element rotates during an engine wind-milling event.

2. The seal assembly of claim 1, wherein the first abradable portion and the second abradable portion include a honeycomb material.

3. The seal assembly of claim 1 wherein the stationary seal element has a rectangular cross section.

4. A gas turbine engine comprising:
  a plurality of blade elements, a casing; and
  a seal assembly between the plurality of blade elements and casing, the seal assembly comprising:
   a stationary seal element including: (i) a heightwise outer segment having a first height and extending continuously from a leading edge to a trailing edge; and (ii) a heightwise inner segment having a second height and a heightwise inner surface that forms an annular surface, the heightwise inner segment formed of three mutually contacting portions including: (a) a first portion being integral with the heightwise outer segment and extending to the leading edge; (b) a second portion that is a first abradable portion extending aft from the first portion; and (c) a third portion that is a second abradable portion extending aft from the first abradable portion to the trailing edge and providing a reduced resistance to wear relative to the second portion; wherein the first abradable portion and the second abradable portion each have a heightwise outer surface that contacts the heightwise outer segment; and
   a rotary seal element that rotates during operation of the gas turbine engine, the rotary seal element comprising a knife edge that faces the annular surface, wherein the stationary seal element and the rotary seal element are configured such that the rotary seal element: (i) engages the first abradable portion when the rotary seal element rotates under engine power; and (ii) engages the second abradable portion when the rotary seal element rotates during an engine wind-milling event.

5. The gas turbine engine of claim 4, wherein the first abradable portion and the second abradable portion include a honeycomb material.

6. The gas turbine engine of claim 4 wherein the stationary seal element has a rectangular cross section.

* * * * *